US012681856B2

(12) United States Patent
Fishel et al.

(10) Patent No.: US 12,681,856 B2
(45) Date of Patent: Jul. 14, 2026

(54) DYNAMIC MIGRATION OF POINT-OF-COHERENCY AND POINT-OF-SERIALIZATION IN NUMA COHERENT INTERCONNECTS

(71) Applicant: Google LLC, Mountain View, CA (US)

(72) Inventors: Liran Fishel, Ra'Anana (IL); David Dayan, Kfar Vitkin (IL)

(73) Assignee: Google LLC, Mountain View, CA (US)

( * ) Notice: Subject to any disclaimer, the term of this patent is extended or adjusted under 35 U.S.C. 154(b) by 48 days.

(21) Appl. No.: 18/777,045

(22) Filed: Jul. 18, 2024

(65) Prior Publication Data

US 2024/0370370 A1 Nov. 7, 2024

Related U.S. Application Data

(63) Continuation of application No. 17/977,421, filed on Oct. 31, 2022, now Pat. No. 12,050,535.

(51) Int. Cl.
*G06F 12/084* (2016.01)
*G06F 12/0811* (2016.01)

(52) U.S. Cl.
CPC ........ *G06F 12/0811* (2013.01); *G06F 12/084* (2013.01); *G06F 2212/2542* (2013.01)

(58) Field of Classification Search
CPC .............. G06F 12/084; G06F 12/0811; G06F 2212/2542; G06F 12/0842; G06F 2212/62; G06F 12/0815; G06F 2212/621; G06F 2212/6042; G06F 9/5061; G06F 12/0871; G06F 12/0897
USPC ......................... 711/154, 118, 129
See application file for complete search history.

(56) References Cited

U.S. PATENT DOCUMENTS

| | | | |
|---|---|---|---|
| 7,581,068 B2 | 8/2009 | Gilbert et al. | |
| 8,185,695 B2 | 5/2012 | Conway et al. | |
| 9,817,760 B2 | 11/2017 | Robinson et al. | |
| 11,080,191 B2 | 8/2021 | Forrest et al. | |
| 2004/0268052 A1 | 12/2004 | Glasco | |

(Continued)

OTHER PUBLICATIONS

Extended European Search Report for European Patent Application No. 25163535.5 dated May 30, 2025. 10 pages.

(Continued)

*Primary Examiner* — Hashem Farrokh
(74) *Attorney, Agent, or Firm* — Lerner David LLP

(57) ABSTRACT

A system for dynamically controlling point-of-coherency or a point-of-serialization of shared data includes a plurality of processing engines grouped into a plurality of separate clusters and a shared communications path communicatively connecting each of the plurality of clusters to one another. Each respective cluster includes memory shared by the processing engines of the respective cluster, each unit of data in the memory being assigned to a single owner cluster responsible for maintaining an authoritative copy and a single manager cluster permanently responsible for assigning the owner cluster responsibility. Each respective cluster also includes a controller configured to receive data requests, track each of a manager status and an ownership status of the respective cluster, and control ownership status changes with respect to respective units of data based at least in part on the tracked ownership and manager statuses of the respective cluster.

20 Claims, 8 Drawing Sheets

(56) References Cited

U.S. PATENT DOCUMENTS

| | | | | |
|---|---|---|---|---|
| 2016/0283374 A1* | 9/2016 | Pal | ......................... | G06F 12/084 |
| 2017/0228317 A1 | 8/2017 | Drapala et al. | | |
| 2017/0371787 A1 | 12/2017 | Kalyanasundharam et al. | | |
| 2019/0196574 A1* | 6/2019 | Tsien | ...................... | G06F 13/26 |
| 2023/0418662 A1* | 12/2023 | Fredette | ................ | G06F 9/4875 |

OTHER PUBLICATIONS

Renz-Wieland et al. Dynamic Parameter Allocation in Parameter Servers. arxiv.org, Cornell University Library, 201 Olin Library Cornell University Ithaca, NY 14853, Jul. 3, 2020 (Jul. 3, 2020), DOI: 10.14778/3407790.3407796, 15 pages.
Extended European Search Report for European Patent Application No. 23172861.9 dated Mar. 21, 2024. 5 pages.

\* cited by examiner

| Cache Line | Cluster Designation |
|------------|---------------------|
| $CL_1$ | MP |
| $CL_2$ | MP |
| $CL_3$ | MN |
| $CL_4$ | SN |
| ⋮ | ⋮ |
| $CL_{n-1}$ | MP |
| $CL_n$ | SP |

DYNAMIC MIGRATION OF POINT-OF-COHERENCY AND POINT-OF-SERIALIZATION IN NUMA COHERENT INTERCONNECTS

CROSS-REFERENCE TO RELATED APPLICATIONS

The present application is a continuation of U.S. patent application Ser. No. 17/977,421, filed Oct. 31, 2022, the disclosures of which are hereby incorporated herein by reference.

BACKGROUND

Non-uniform memory access (NUMA) is an architecture for memory storage in which processing engines (PEs) are clustered into a multiprocessing system, referred to herein as a "NUMA cluster," in which the PEs share memory with one another locally. The shared memory is referred to as "last-level cache" (LLC).

Multiple NUMA clusters may be interconnected with one another over a shared interconnect, such as a shared bus or data path, so that the NUMA clusters can access each other's memory. The resulting system may be referred to as a symmetric multiprocessing (SMP) system, also referred to as a "tightly-coupled" or "share everything" system.

In order to avoid the shared interconnect becoming over-loaded with data requests between NUMA clusters, NUMA clusters sharing the same data may store respective copies of the data in the respective LLC of each NUMA cluster. The point-of-coherency (PoC) and a point-of-serialization (POS) for each data line is designated to one of the NUMA clusters. The job of the designated cluster as PoC is to maintain coherency between the separate copies of the data. In effect, the POC receives communications from the other clusters inquiring whether the copies of the data at the other clusters is up-to-date, and in the case of the data at another cluster being updated a communication indicating the update. The job of the designated cluster as PoS is to dictate an order of the operations being performed at the different clusters. In effect, serialization maintains coherency of the data across the system by avoiding clusters simultaneously changing the data in different ways.

While the storage of copies of shared data between NUMA clusters can alleviate some traffic along the shared interconnect, the need for constant checks with the PoC and POS still creates some undue traffic. For instance, if a first NUMA cluster is assigned as a PoC and POS for a certain data block but is not using that data block, while a separate, second NUMA cluster repeatedly accesses the data block, updates the data block or both, then every access and update request must be communicated over the shared interconnect between the first and second NUMA clusters. This added interconnect traffic introduces latency into the system, particularly for the second NUMA cluster which must wait for communications to pass over the interconnect before continuing with access and processing of its locally stored copy of the data block.

BRIEF SUMMARY

The present disclosure provides a method and system for decreasing the latency of coherency and serialization checks by dynamically moving the PoC and PoS designations of shared data, also referred to as "ownership" of the shared data, between NUMA clusters. This is accomplished using a tracker, also referred to as a snoop filter, to monitor the state of the shared data, and a logic framework for determining whether or not to move the ownership of the shared data based on the monitored state.

In one aspect of the present disclosure, a method of dynamically controlling at least one of a point-of-coherency or a point-of-serialization for shared data includes: receiving, by a controller, a request associated with data stored in a memory cache line of a last-level cache, wherein the last-level cache is included in a first cluster of a plurality of clusters included in a non-uniform memory access architecture, wherein the plurality of clusters includes a single owner cluster that is responsible for maintaining an authoritative copy of the data and a single manager cluster that is permanently responsible for assigning the responsibility for maintaining the authoritative copy of the data; determining, by the controller, state information of the first cluster with respect to the data, wherein the state information includes each of a manager status of the first cluster indicating whether the first cluster is the manager cluster for the data, and an ownership status of the first cluster indicating whether the first cluster is the owner cluster for the data; and controlling, by the controller, a change to the ownership status of the first cluster based on the manager status of the first cluster and the ownership status of the first cluster.

In some examples, the method may further include communicating, by the controller, the change to the ownership status of the first cluster to respective controllers of the plurality of clusters other than the first cluster.

In some examples, the request associated with the data may be a request to write the data to the last-level cache of the first cluster, and controlling the change to the ownership status of the first cluster may include, in response to the first cluster being the manager cluster and not being the owner cluster, changing by the controller, the state information of the first cluster to indicate the first cluster being the owner cluster.

In some examples, the request associated with the data may be a request to write the data to the last-level cache of the first cluster, and controlling the change to the ownership status of the first cluster may include, in response to the first cluster not being the manager cluster and not being the owner cluster, and further in response to the data being in last-level cache of a second cluster of the plurality of clusters that is not the manager cluster, instructing, by the controller, to change state information of the manager cluster to indicate the manager cluster being the owner cluster.

In some examples, the method may further include communicating by the controller, the change to the ownership status of the manager cluster to respective controllers of the plurality of clusters other than the first cluster.

In some examples, the method may further include in response to the first cluster not being the manager cluster and not being the owner cluster, and further in response to the data being in last-level cache of a second cluster of the plurality of clusters that is the manager cluster, determining, by the controller, to maintain the state information of the manager cluster to indicate the manager cluster being the owner cluster.

In some examples, the method may further include, in response to the first cluster not being the manager cluster and not being the owner cluster, and further in response to the data not being in last-level cache of any of the plurality of clusters, setting, by the controller, the state information of the first cluster to indicate the first cluster being both the manager cluster and the owner cluster.

In some examples, the method may further include, in response to the first cluster being the owner cluster, determining, by the controller, to maintain the ownership status of the first cluster as the owner cluster.

In some examples, the method may further include, in response to the first cluster not being the owner cluster, instructing, by the controller, a direct lower-level cache to lower-level cache communication between the first cluster and the owner cluster to maintain coherency of the request.

In some examples, the method may further include instructing, by the controller, storage of the data included in the request in the last-level cache of the first cluster.

Another aspect of the disclosure is directed to a system for dynamically controlling at least one of a point-of-coherency or a point-of-serialization of shared data. The system may include: a plurality of processing engines grouped into a plurality of separate clusters; and a shared communications path communicatively connecting each of the plurality of clusters to one another. Each respective cluster may include: memory shared by the processing engines of the respective cluster, the memory storing units of data, wherein for each unit of data the plurality of clusters may include a single owner cluster that is responsible for maintaining an authoritative copy of the unit of data and a single manager cluster that is permanently responsible for assigning the responsibility for maintaining the authoritative copy of the unit of data; and a controller configured to: receive a data request associated with a first unit of data; track a status of the respective cluster with respect to the first unit of data, the status including each of a manager status of the respective cluster indicating whether the respective cluster is the manager cluster for the first unit of data, and an ownership status of the respective cluster indicating whether the respective cluster is the owner cluster for the first unit of data; and control ownership status changes with respect to the first unit of data based at least in part on the tracked status of the respective cluster.

In some examples, each cache line of the memory may be configured to store a respective unit of the units of data.

In some examples, the controller may include control logic for determining whether to change ownership status of the respective cluster with respect to the first unit of data, and the control logic may include: a first rule to assign the ownership status to any cluster storing a single copy of the first unit of data within the plurality of clusters; and a second rule to assign the ownership status to the manager cluster of the first unit of data when the first unit of data is stored at two or more of the plurality of clusters.

In some examples, the control logic may include a third rule to assign the ownership status to the manager cluster by default.

In some examples, the controller may be further configured to control checking a coherency of the first unit of data based on the ownership status.

In some examples, the controller may be further configured to control an order to coherency checks to the first unit of data initiated by multiple clusters based on the ownership status.

In some examples, the controller may be configured to: confirm the coherency of the first unit of data without communicating over the shared communications path when the respective cluster is the owner cluster; and check the coherency of the first unit of data by controlling communication with the owner cluster over the shared communications path when the respective cluster is not the owner cluster.

In some examples, communication with the owner cluster over the shared communications path may be a direct communication between a cache line of the memory of the respective cluster and a cache line of the memory of the owner cluster.

In some examples, the controller may be configured to change the ownership status of the respective cluster from not being the owner cluster to being the owner cluster in response to the respective cluster being the manager cluster of the first unit of data for which the data request is received.

In some examples, the controller may be configured to change the ownership status of the respective cluster from being the owner cluster to not being the owner cluster in response to the respective cluster not being the manager cluster and at least one another cluster of the plurality of clusters including the first unit of data.

BRIEF DESCRIPTION OF THE DRAWINGS

FIG. 3 is a diagram showing an example table stored in the controller of FIG. 2.

DETAILED DESCRIPTION

Overview

Figure 1:
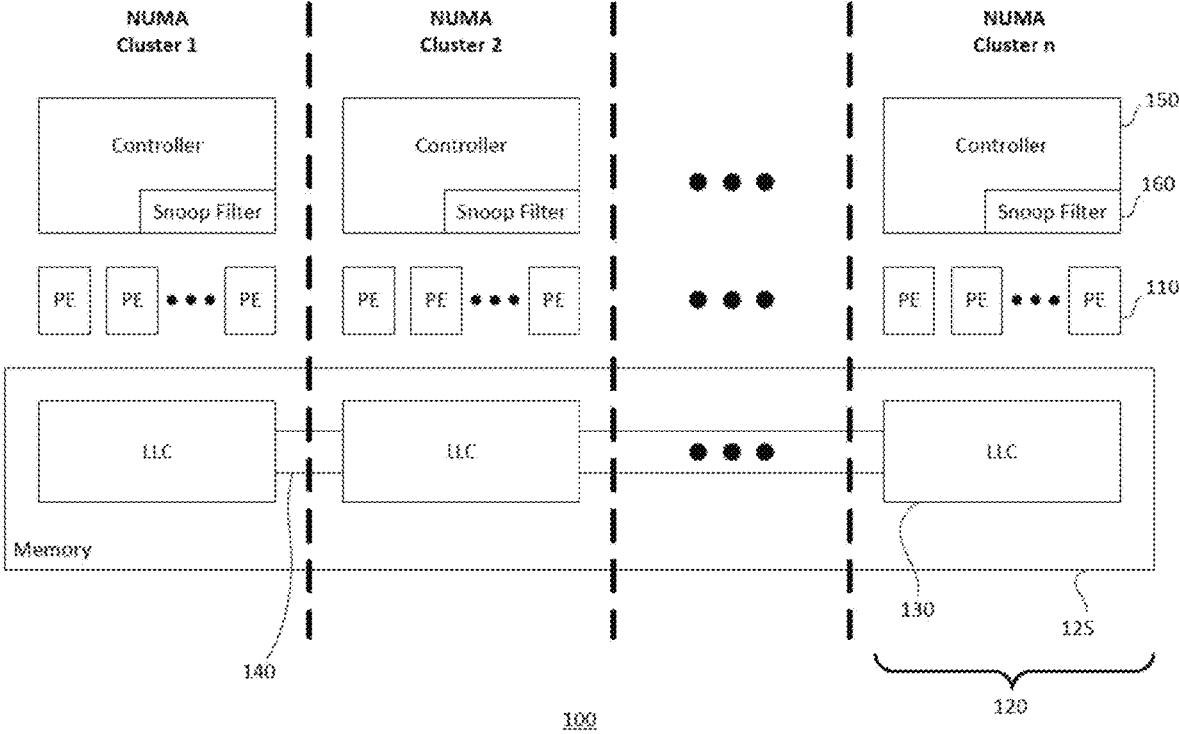
FIG. 1 is a block diagram of a system in accordance with an aspect of the disclosure.

A PoC and PoS for shared data within a system having NUMA architecture can be dynamically controlled using the systems and techniques described herein.

The NUMA architecture can include a plurality of processors grouped into non-overlapping clusters, and store data within cache lines that are shared by the processors of a respective cluster. Cache lines of different clusters may communicate with one another over a shared bus or interconnect, but such communications introduce latency into the system and are avoided when possible. In order to reduce the latency, each cluster includes its own respective controller that includes control logic for dictating a PoC and PoS that defines an authoritative source for data copied between clusters.

In a scenario in which the same data is stored within cache lines of different clusters, the control logic may instruct to maintain a default PoC and PoS, such as the cluster at which the data originated. Alternatively, in a scenario in which the data is stored in cache lines of only one cluster, the control logic may instruct to assign the PoC and PoS to the cluster containing the data. If the cluster containing the data is not the same as the cluster at which the data originated, the assignment may involve changing the PoC and PoS from one cluster to another.

An example of an event that triggers a change in PoC and PoS assignment may be one cluster receiving a data request associated with the data stored within cache lines of different clusters. For instance, if the data was previously stored in one cluster and the data request causes the data to be stored in two clusters, then it may be necessary to move the PoC and PoS back to the cluster from which the data originated.

In order for these determinations to be made, the controller may further store the status of its respective cluster, particularly an ownership status indicating whether the cluster is currently the owner of the data meaning that the cluster is the PoC and PoS, and a manager status indicating whether the cluster is responsible for assigning or delegating the ownership status. The manager cluster is also the default PoC and PoS. In some instances, additional information may also be needed by the controller to determine whether to change the PoC and PoS. For example, knowing the ownership status and manager status of the controller's respective cluster may in some scenarios be insufficient to infer whether the data is stored in the cache lines of any other cluster. In such cases, the controller may further base movement of the PoC and PoS on information indicating whether the data is stored in cache lines of other clusters.

Dynamically moving the PoC and POS to clusters that are using the corresponding can significantly reduce latency within the NUMA system by avoiding those clusters from having to constantly communicate with the originating cluster whether the data is up-to-date. Instead, by moving the PoC and PoS to the cluster using the data, the cluster can confirm the coherency of the data on its own without time-consuming communications over the shared bus or interconnect. This can result in overall improvement to performance and processing efficiency of the system.

Example Systems

FIG. 1 is a block diagram of an example non-uniform memory access (NUMA) system 100 for dynamically migrating ownership of shareable data in accordance with an aspect of the present disclosure. The system 100 may include a plurality of processing engines (PEs) 110 that may be grouped into a plurality of separate clusters 120, whereby each cluster includes one or more PEs. The PEs may include well-known processors or other lesser-known types of processors. The number of PEs in each cluster may vary from one cluster to the next, and the number of clusters included in the system 100 may also vary from one system to another. Typically, the clusters of PEs are arranged within a closed physical environment, such as on a system-on-a-chip (SoC). As such, the memory assigned to each respective cluster 120 may be relatively local to the PEs 110 of that cluster 120.

Each cluster 120 may include memory 125, and the memory 125 may include a layer of shared memory cache 130 that is capable of being accessed by all of the PEs 110 within the cluster 120. The shared memory cache 130 is referred to herein as last-level cache (LLC) but in other systems may be referred to as system-level cache (SLC). LLC may be considered an intermediate-level memory, as the accessibility properties of the LLC memory are between those of memory assigned to specific PEs (low-level memory) and memory assigned to the system as a whole (high-level memory). The memory 125 may include one or more dynamic random access memory (DRAM) chips.

The clusters 120 may further be communicatively connected with one another by a communications path, referred to herein as a "shared interconnect" 140. The shared interconnect 140 may be an input/output (I/O) data bus or other datapath over which instructions and data may be shared between the clusters. For example, the LLC memory belonging to different clusters 120 of the system 100 may communicate with one another by direct LLC-to-LLC communication over the shared interconnect. In the case of an SoC, the shared interconnect may reside on the SoC and interconnect the various clusters of PEs and memory of the SoC to one another.

Typically, the NUMA system architecture shown in FIG. 1 is implemented for systems in which sharing of memory among PEs of a single cluster is relatively common, but sharing of memory between PEs of different clusters is less frequent. As such, while it is possible for clusters to share data among one another, it is much more common for multiple PEs of a single cluster to access the same data.

In order to manage communications and processes between clusters of the system, each cluster 120 may include its own respective controller 150. The controller 150 may include components that reside within its respective cluster 120, such that communications between the PEs 110 and memory 125 of the respective cluster 120 may be facilitated without using the shared interconnect 140.

Each controller 150 may include a respective snoop filter 160 configured to maintain the coherency of data stored among the clusters 120. The snoop filter 160 may include both control logic and cache in order to monitor all coherent traffic within the system. For instance, the snoop filter 160 may track the cluster or clusters at which the data stored in the LLC memory 130 exists, track which cluster is responsible for maintaining an authoritative copy of the stored memory, referred to herein as the "owner," and track which cluster is responsible for delegating the responsibility for maintaining the authoritative copy, referred to herein as the "manager." Knowledge of the hosting clusters, the owner cluster and the manager cluster may be used to ensure that all operations on the stored data are handled coherently and checked against a single authoritative source, even if the authoritative source moves between different clusters 120 of the system 100.

Although the controller 150 is shown in FIG. 1 as being separate from the PEs 110 and memory 120 of the system, it should be understood that the controller may include processing and memory resources including the PEs 110 and memory 120.

Figure 2:
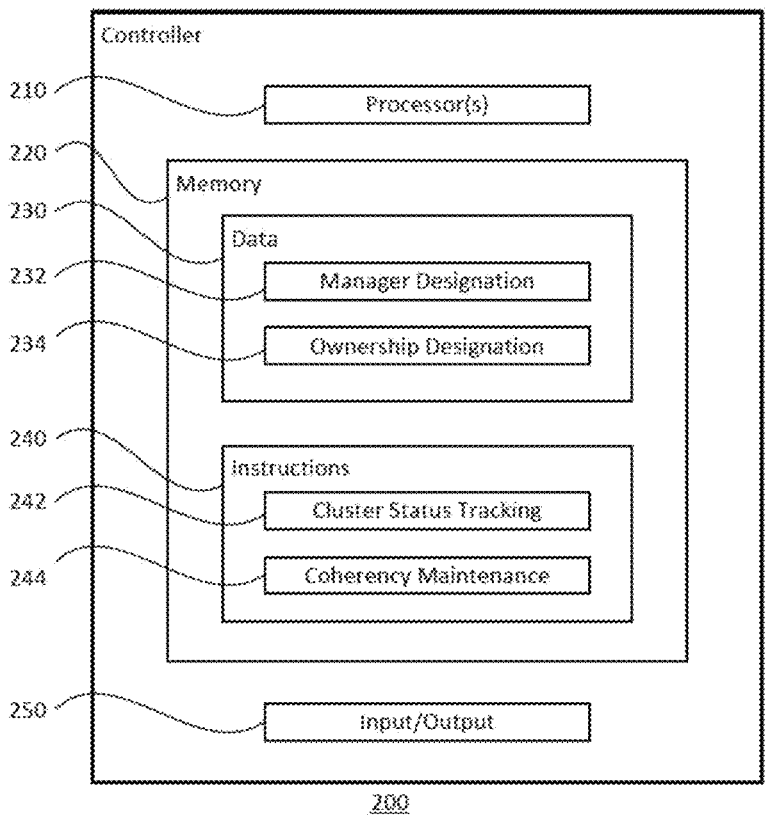
FIG. 2 is a block diagram of a controller in accordance with an aspect of the disclosure.

FIG. 2 is a functional block diagram illustrating an example controller 200. The controller 200 may include one or more processors 210, as well as memory 220. The one or more processors 210 may include one or more processing engines, such as the PEs 110 shown in the example system 100 of FIG. 1. Additionally, the memory 220 can include last-level cache, such as the shared memory cache 130 shown in the example system 100 of FIG. 1. The memory 220 may store information accessible by the processor 210 without having to communicate over an input/output bus or other communication path external to the cluster of the controller 200. Communications may include data 230 that can be retrieved, manipulated or stored by the processor 210, instructions 240 that can be executed by the processor 210, or a combination thereof.

The controller 200 may further be capable of accessing input/output components 250, such as the shared interconnect 140 of the example system 100 of FIG. 1, for receiving and transmitting data with other components of the system, such as with one or more controllers belonging to other clusters of the system, when such communication is necessary. Additionally, the input/output components 250 may support the cluster being able to communicate with or be accessed by other external devices over various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

In some examples, received data and instructions may include data requests associated with the respective cluster of the controller 200, queries requesting the status of cache lines included in the LLC of the respective cluster of the controller 200, and information asserting the status of cache lines included in the LLC of the respective cluster of the controller 200 and of other clusters included in the system. Also, in some examples, transmitted data may include queries requesting the status of cache lines included in the LLC of other clusters of the system, and information asserting the status of cache lines included in the LLC of the respective cluster of the controller 200 and of other clusters included in the system. Examples of instructions, queries and information being communicated between controllers of a NUMA system are described in greater detail in connection with FIGS. 6A-6C.

The controller data 230 included in the controller 200 may store information necessary for managing the LLC of the controller's corresponding cluster. For example, for each cache line of the cluster's LLC in which data is stored, the controller data 230 may include an indication of the cluster's status vis-à-vis that cache line. The cluster status may include a manager designation 232 indicating whether or not the cluster is designated as a manager of the cache line. The manager designation 232 may be treated by the system as static. In other words, for data that is shareable between the clusters of the system, one and only one cluster is designated as manager for the shareable data, and this designation cannot be changed while the data continues to exist within the system. The manager designation 232 may indicate which cluster of the system is permanently responsible for managing designation of the point of coherency (PoC) and point of serialization (POS) of the associated cache line.

The cluster status may further include an ownership designation 234 indicating whether or not the cluster is designated as owner of the cache line. The ownership designation 234 may be treated as dynamic. In other words, one and only one cluster is designated as owner of the shareable data at any given time, but this designation can be changed from one cluster to another cluster while the data continues to exist within the system. The ownership designation 234 may indicate which cluster of the system is currently designated as the PoC and POS, whereby the associated cache line of the owner cluster may indicate a most up-to-date version of the data, and access to the associated cache line of the owner cluster may be queued so that the other clusters access and update the data at the owner cluster in an organized fashion.

For clusters containing a copy of the data and that are not designated as manager of the data, the manager designation 232 for those clusters may instead indicate that those clusters are subordinate to the manager cluster. Likewise, for clusters containing a copy of the data and that are not designated as owner of the data, the ownership designation 234 for those clusters may instead indicate that those clusters are not-an-owner of the data. Since designations are issued at the granularity of cache lines within the LLC, each line of the LLC of a given cluster may be associated with a different respective manager designation 232 and ownership designation 234.

FIG. 3 is an example table 300 illustrating cluster designations at a cache line granularity. In table 300, each cache line $CL_1$-$CL_n$ of a plurality of N cache lines listed in the left-hand column of the table is attributed with two designations, corresponding to the two letters listed in the right-hand column of the table. The first letter is either "M" or "S" to indicate whether the manager designation 232 is "Manager" or "Subordinate," respectively. The second letter is either "P" or N" to indicate whether the ownership designation is "Positive" (meaning that the cluster is owner of the associated cache line) or "Negative" (meaning that the cluster is not the owner of the associated cache line), respectively. As shown in the table 300, the designations may be assigned at a cache-line degree of granularity.

Returning to FIG. 2, instructions 240 executed by the processor 210 may include one or more routines for processing and managing the data and requests received at the system. These routines may include, but are not limited to, a cluster status tracking routine 242 for tracking the owner and manager status of the corresponding cluster for each cache line stored in the LLC memory, and a coherency maintenance routine 244 for maintaining coherency of the LLC memory of each cluster with one another. Example implementations of these routines are described in greater detail in connection with the example methods presented herein.

Example Methods

Figure 4:
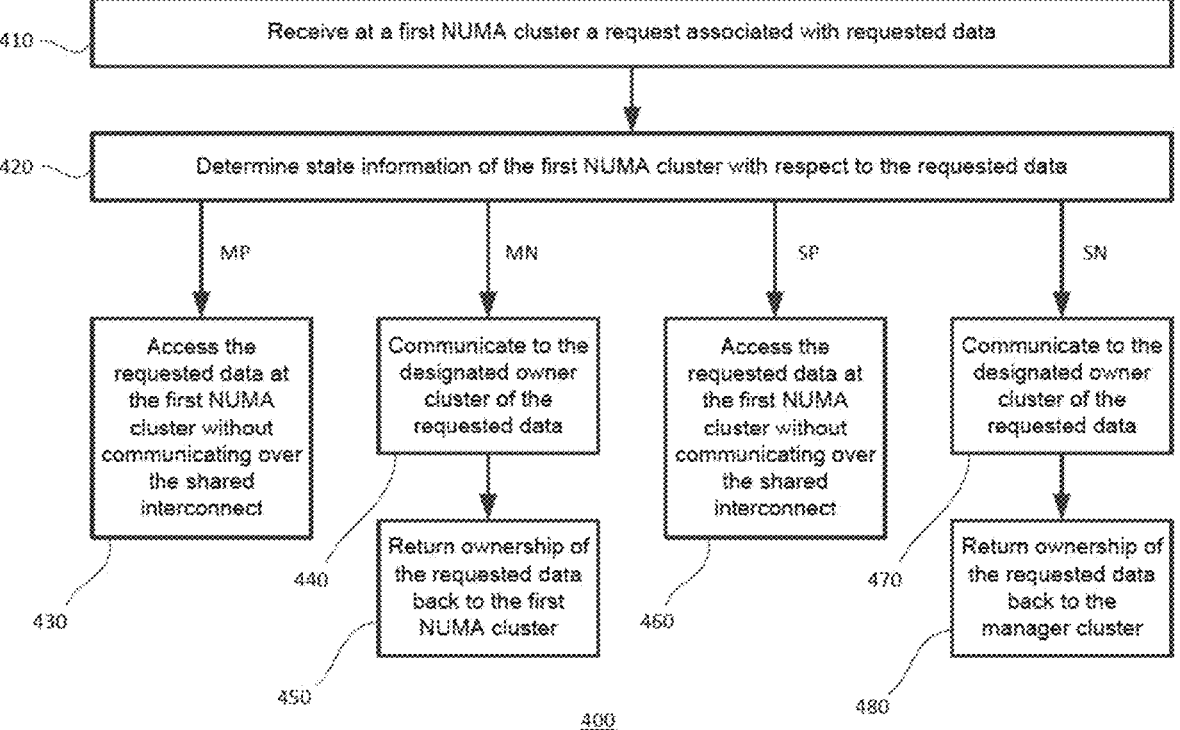
FIG. 4 is a flow diagram illustrating a routine in accordance with an aspect of the disclosure.

FIG. 4 is a flow diagram illustrating an example routine 400 for dynamically controlling ownership of shareable data in accordance with an aspect of the present disclosure. The routine 400 may be executed by a controller of a first NUMA cluster among a plurality of interconnected NUMA clusters, such as the example controller 200 shown in FIG. 2.

At block 410, the controller may receive a request associated with requested data. For example, the requested data may be stored in a memory cache line of the LLC of the first NUMA cluster. The requested data may or may not be stored in the LLC of the other NUMA clusters of the plurality of NUMA clusters.

At block 420, the controller may determine state information of the first NUMA cluster with respect to the requested data. The state information may be stored in the memory of the controller, and may indicate each of the ownership status and the manager status of the first NUMA cluster, whereby the ownership status manager status is a dynamic designation that can be changed depending on the state information, and whereby the manager status is a static designation that does not change and can effectively serve as a default setting of the ownership status. The state information can be any one of MP (first NUMA cluster is the manager and has ownership of the requested data), MN (first NUMA cluster is the manager and does not have ownership of the requested data), SP (first NUMA cluster is not the manager but has ownership of the requested data) and SN (first NUMA cluster is not the manager and does not have ownership of the requested data).

If the state information is determined to be MP, then operations may continue at block 430 with the controller accessing the requested data at the LLC of the first NUMA cluster without requiring communication over the shared interconnect. The local copy of the requested data may be considered up-to-date on the basis that the first NUMA cluster is known to have ownership, meaning that any changes to the requested data have been already communicated to the first NUMA cluster.

If the state information is determined to be MN, then operations may continue at block 440 with the controller instructing the LLC of the first NUMA cluster to communicate over the shared interconnect to the LLC of a second NUMA cluster that is the designated owner of the shared data. The communication may query the current state of the requested data, which in turn may be used to write the requested data to the LLC of the first NUMA cluster. Additionally, since the requested data is now shared between two or more clusters, at block 450, the controller may update the ownership status of the shared data, whereby ownership is moved from the second NUMA cluster back to the first NUMA cluster. The change in ownership status may also be communicated to the second NUMA cluster so that further requests at the second NUMA cluster are directed to the first NUMA cluster for coherency checks and serialization operations.

If the state information is determined to be SP, then operations may continue at block 460 with the controller accessing the requested data at the LLC of the first NUMA cluster without requiring communication over the shared interconnect. The local copy of the requested data may be considered up-to-date on the basis that the first NUMA cluster is known to have ownership, despite the first NUMA cluster not being designated manager. In other words, the SP status effectively indicates that the first NUMA cluster is the only cluster at which the requested data is written to its respective LLC, since if the requested data were written to the LLC of two different clusters, then the ownership status would have been returned to the manager NUMA cluster. Thus, since the requested data is written only to the first NUMA cluster's LLC, no coherency check or serialization operation needs to be carried out between NUMA clusters over the shared interconnect.

If the state information is determined to be SN, then operations may continue at block 470 with the controller instructing the LLC of the first NUMA cluster to communicate over the shared interconnect to the LLC of a second NUMA cluster that is the designated owner of the shared data. The communication may query the current state of the requested data, which in turn may be used to write the requested data to the LLC of the first NUMA cluster. Additionally, since the requested data is now shared between at least two clusters, which are the first and second NUMA clusters, at block 480, the controller may communicate over the shared interconnect an instruction for the ownership status of the shared data to be returned to the NUMA cluster that is designated as manager. If the second NUMA cluster is designated as the manager of the requested data, then this instruction may result in no change to the ownership designation. However, if the second NUMA cluster is designated as a subordinate to a third NUMA cluster and the third NUMA cluster is designated as the manager of the requested data, then the instruction may result in ownership of the requested data being transferred from the second NUMA cluster back to the third NUMA cluster so that further requests at each of the first and second NUMA clusters are directed to the third NUMA cluster for coherency checks and serialization operations.

Figure 5:
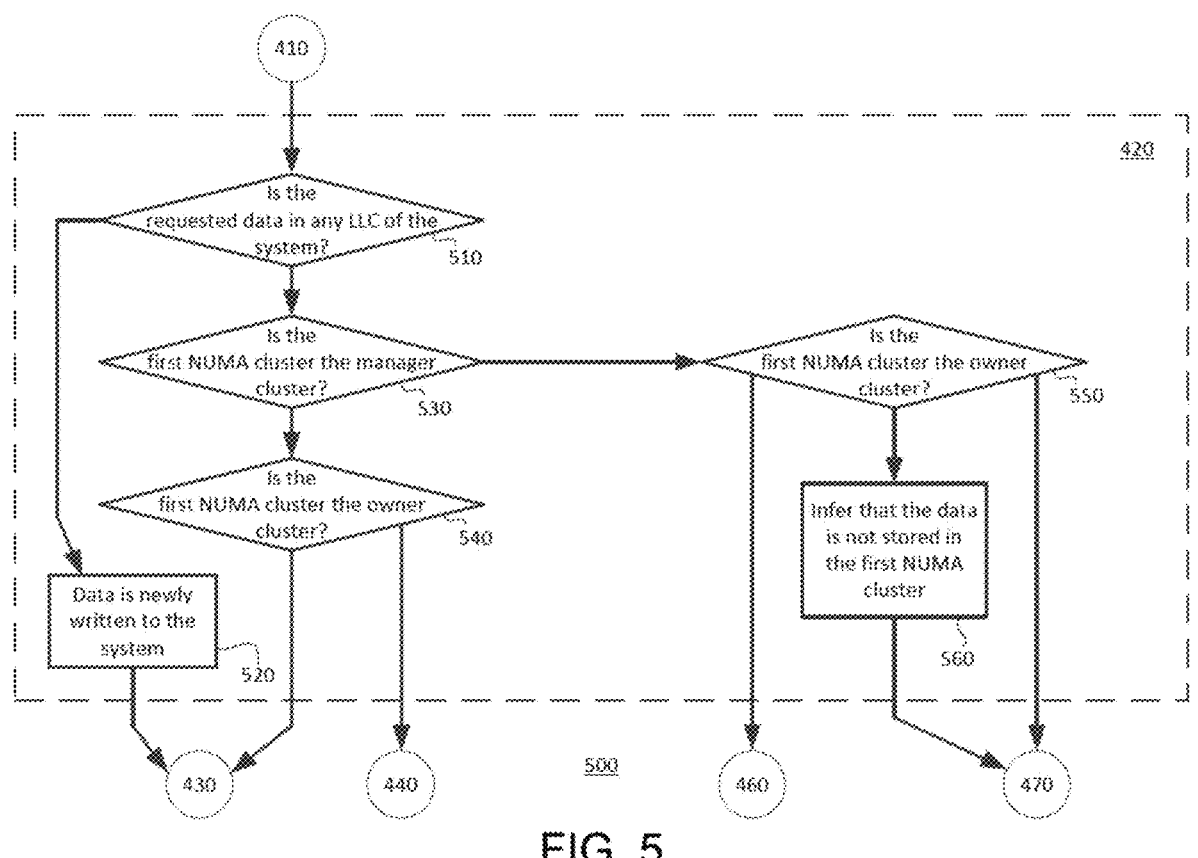
FIG. 5 is an illustration of a sub-routine of the routine of FIG. 4.

FIG. 5 is a flow diagram illustrating an example subroutine 500 for determining the state information of the first NUMA cluster with respect to the requested data, corresponding to block 420 of the routine 400 of FIG. 4.

At block 510, the controller may check the controller data for an indication of whether the requested data exists in any LLC of the system. If the determination at block 510 is that the requested data does not exist, then at block 520, it may be determined by the controller that the requested data is newly written data at the first NUMA cluster and the controller may designate the first NUMA cluster as both manager and designated owner of the requested data, MP, and operations may continue at block 430 of FIG. 4.

Conversely, if it is determined at block 510 that the requested data does already exist in the system, then operations may continue at block 530 with the controller determining whether the first NUMA cluster is designated as manager. If the first NUMA cluster is designated as manager, then operations may continue at block 540 with the controller determining whether the first NUMA cluster is designated as owner. If the first NUMA cluster is designated as owner, then the controller may determine the status of the first NUMA cluster as being MP, and operations may continue at block 430 of FIG. 4. Alternatively, if the first NUMA cluster is not designated as owner, then the controller may determine the status of the first NUMA cluster as being MN, and operations may continue at block 440 of FIG. 4.

If the first NUMA cluster is designated as subordinate, or more generally if the first NUMA cluster is not designated as the manager, then operations may continue at block 550 with the controller determining whether the first NUMA cluster is designated as owner. If the first NUMA cluster is designated as owner, then the controller may determine the status of the first NUMA cluster as being SP, and operations may continue at block 460 of FIG. 4. Alternatively, if the first NUMA cluster is not designated as owner, then the controller may determine the status of the first NUMA cluster as being SN, and operations may continue at block 470 of FIG. 4.

In some instances, such as when the requested data is being newly copied to the first NUMA cluster, the determination at block 550 may not return an explicit result, referred to herein as a "miss." In response to a miss, operations may continue at block 560, with the controller indirectly inferring that the requested data does not exist in the first NUMA cluster and that the first NUMA cluster is not the owner of the requested data. Thus, the controller may determine the status of the first NUMA cluster as being SN, and operations may continue at block 470 of FIG. 4.

Figure 6A:
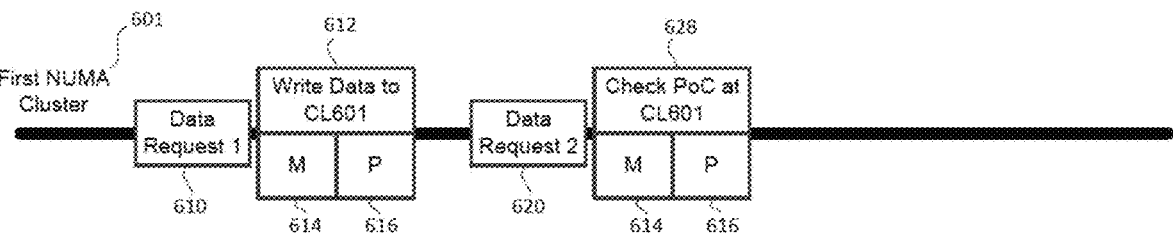
FIGS. 6A-6C is a flow diagram of an example implementation of the routine of FIG. 4.
Figure 6B:
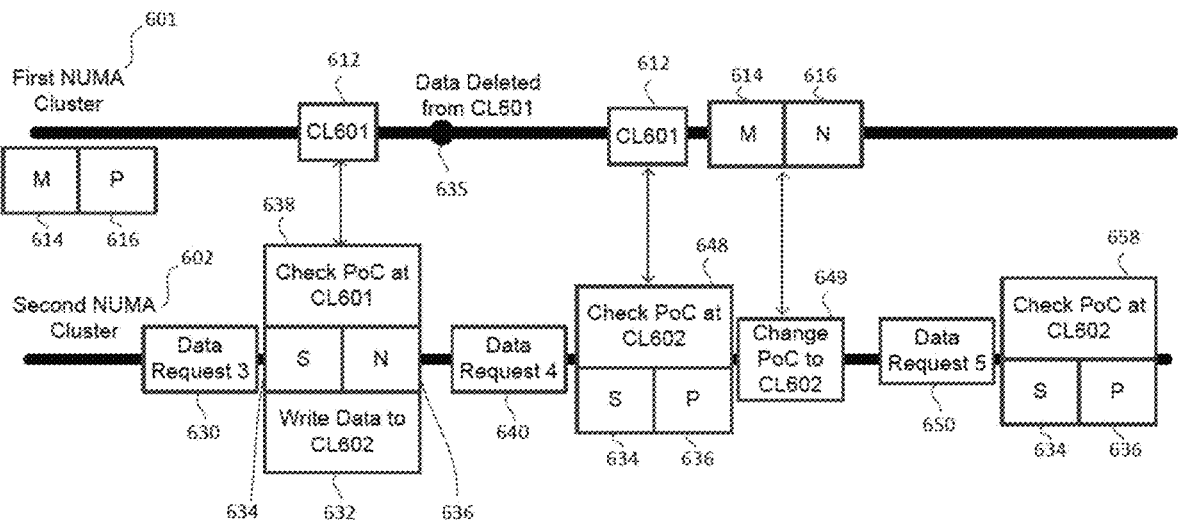
Figure 6C:
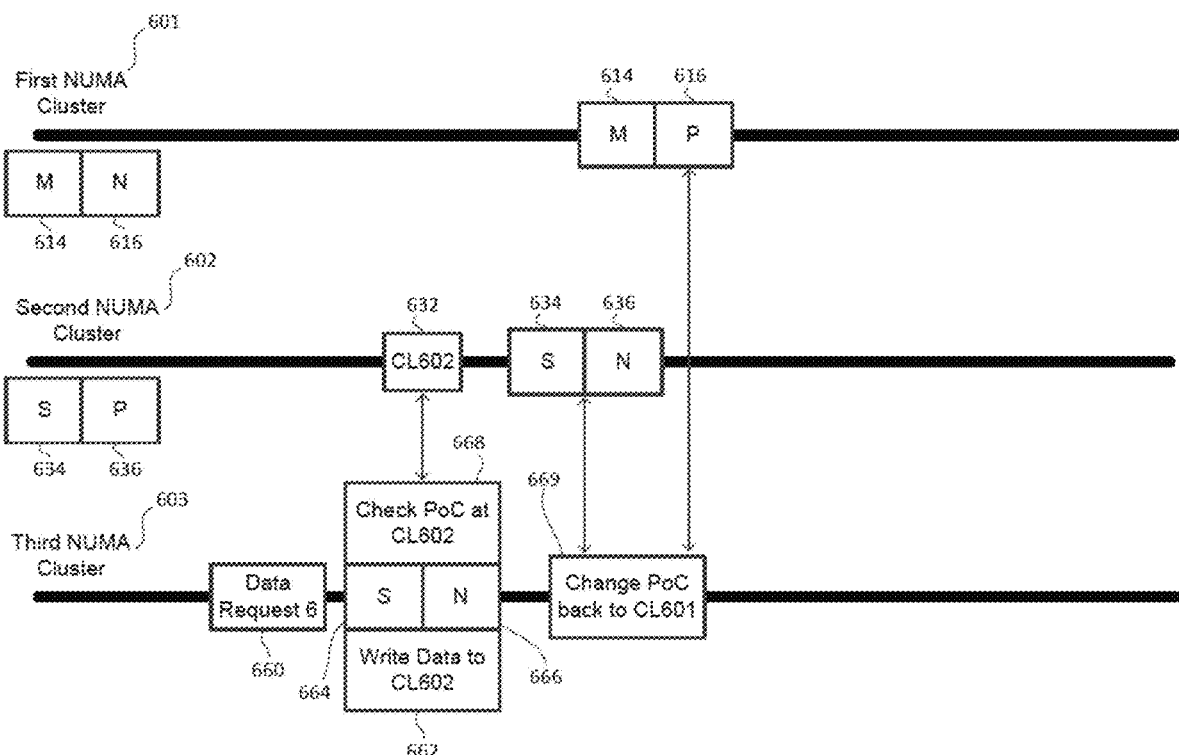

FIGS. 6A-6C illustrate example operations of interconnected NUMA clusters within a system according to the example routine 400 of FIG. 4. The example operations demonstrate how ownership designations for requested data can be dynamically moved between clusters depending on the changing states of those clusters and the points from which the requested data is being requested.

Beginning with FIG. 6A, a system 600 is shown to include a first NUMA cluster 601.

A first data request 610 is received at the first NUMA cluster 601. The controller of the first NUMA cluster 601 determines that the data corresponding to the first data request 610 does not exist in any memory cache line of the system 600, meaning that the data corresponding to the first data request 610 is being newly written to the system 600. In response to this determination, the newly written data is stored at a memory cache line 612 of the LLC of the first NUMA cluster 601, referred to in FIG. 6A as CL601, the first NUMA cluster 601 is designated as the manager 614 of the newly written data, and as having ownership 616 of the newly written data. The memory cache line 612, manager designation 614, and ownership designation 616 are all recorded at the controller memory for the controller of the first NUMA cluster 601.

Next, a second data request 620 is received at the first NUMA cluster 601. The controller of the first NUMA cluster 601 checks the controller memory and determines that the data corresponding to the second data request 620 already exists in a memory cache line of the first NUMA cluster 601, that the first NUMA cluster 601 is the designated manager 614, and that the first NUMA cluster 601 is the designated owner 616. In response to these determinations, the controller can infer that the data stored at the memory cache line 612 of the LLC of the first NUMA cluster 601 is up-to-date and that no communication over a shared interconnect of the system 600 is required to ensure coherency or serialization. Thus, the second data request 620 is handled locally by the first NUMA cluster 601 by checking the local PoC 628 without burdening the shared interconnect of the system 600.

Next, at FIG. 6B, the system 600 is shown to include a second NUMA cluster 602 at which data requests corresponding to the same requested data are received.

A third data request 630 is received at the second NUMA cluster 602. The controller of the second NUMA cluster 602 may determine that the data corresponding to the third data request 630 does not exist in a memory cache line of the second NUMA cluster 602, and that the data does exist in the memory cache line 612 of the first NUMA cluster 601. The controller may also either determine from an explicit indication in the controller memory—or infer from a lack of indication in the controller memory-that the status of the second NUMA cluster 602 is SN, meaning that the second NUMA cluster 602 is designated as subordinate 634 to the first NUMA cluster 601 and that the second NUMA cluster 602 is designated as not-the-owner 636 of the requested data. In response to this determination, a communication 638 may be sent over the shared interconnect between the second NUMA cluster 602 and the first NUMA cluster 601 to ensure serialization of the third data request 630 and coherency of the corresponding data contained in the third data request 630. The data may further be copied to a memory cache line 632 of the LLC of the second NUMA cluster 602. The first NUMA cluster 601 remains designated as the owner of the corresponding data.

At a later time after the corresponding data is cleared 635 from the memory cache line 612 of the LLC of the first NUMA cluster 601, a fourth data request 640 may be received at the second NUMA cluster 602. The controller of the second NUMA cluster 602 may determine that the data corresponding to the fourth data request 640 exists in the memory cache line 632 of the second NUMA cluster 602, and that the data does not exist in any memory cache line of the first NUMA cluster 601 or any other NUMA cluster of the system 600. The controller may also determine that the second NUMA cluster 602 is designated as subordinate 634, and that the second NUMA cluster is designated as not-the-owner 636. In response to this determination, a communication 648 may be sent over the shared interconnect from the second NUMA cluster 602 to the first NUMA cluster 601 to ensure serialization of the fourth data request 640 and coherency of the corresponding data contained in the fourth data request 640. Additionally, another communication 649 may instruct the first NUMA cluster 601 to relinquish designation as the owner of the corresponding data, whereby the second NUMA cluster assumes the role of ownership for the corresponding data. As such, the controller memories of the first and second NUMA clusters 601, 602 may further be updated to indicate that the second NUMA cluster 602 is designated as the owner and that the first NUMA cluster is designated as not-the-owner.

Next, a fifth data request 650 is received at the second NUMA cluster 602. The controller of the second NUMA cluster 602 checks the controller memory and determines that the data corresponding to the fifth data request 650 already exists in the memory cache line 632 of the second NUMA cluster 602, that the second NUMA cluster 602 is designated as a subordinate 634, and that the second NUMA cluster 602 is the designated owner 636. In response to these determinations, the controller can infer that the data stored at the memory cache line 632 of the LLC of the second NUMA cluster 602 is up-to-date and that no communication over the shared interconnect of the system 600 is required to ensure coherency or serialization. Thus, the fifth data request 650 is handled locally by the second NUMA cluster 602 by checking the local PoC 658 without burdening the shared interconnect of the system 600.

The example of the fifth data request demonstrates an advantage of the present disclosure in reducing latency for execution of the request. For a system with static points of coherency and status points of serialization, the first NUMA cluster 601 would remain the PoC and PoS of the memory cache line 632 of the second NUMA cluster 602, thereby requiring communication over the shared interconnect to confirm coherency and ensure serialization. By contrast, in the present disclosure, by dynamically moving the PoC and PoS designations from the first NUMA cluster 601 to the second NUMA cluster 602, the fifth data request can be executed at the second NUMA cluster 602 without having to check with the first NUMA cluster 601, thereby avoiding saving the time required for inter-cluster communication between the first and second NUMA clusters 601, 602 over the shared interconnect. Furthermore, if the second NUMA cluster receives additional data requests corresponding to the data in memory cache line 632, these requests may also be handled without further communication over the shared interconnect. Thus, the reduction in latency and improvement in processing may increase as the number of data requests corresponding to the data in memory cache line 632 increases.

The advantage of moving the PoC and PoS may be realized in the example of FIG. 6B since the data is written to only one NUMA cluster, particularly the second NUMA cluster 602. However, if the data exists in the LLC of two or more NUMA clusters at the same time, then dynamically moving ownership of the memory cache lines containing the data may be disadvantageous. For example, if both the first and second NUMA clusters 601, 602 were to contain the data, then data requests may arrive at both clusters and ownership designation may constantly switch hands between the first and second NUMA clusters 601, 602. The inter-cluster communications required for these constant ownership designation switches could be even more burdensome than standard coherency and serialization checks, and thus latency could increase instead of decrease as a result of the inter-cluster communications. Therefore, in such a situation, as well as other situations in which the data exists in the LLC of two or more NUMA clusters at the same time, ownership of the data may be returned to a default owner, which may be the designated manager.

FIG. 6C illustrates an example of such a scenario. In the example of FIG. 6C, the system 600 is shown to include a third NUMA cluster 603 at which data requests corresponding to the same requested data are received.

A sixth data request 660 is received at the third NUMA cluster 603. The controller of the third NUMA cluster 603 may determine that the data corresponding to the sixth data request 660 does not exist in a memory cache line of the third NUMA cluster 603, but that the data does exist in the memory cache line 632 of the second NUMA cluster 602. The controller may also either determine from an explicit indication in the controller memory—or infer from a lack of indication in the controller memory-that the status of the third NUMA cluster 603 is SN, meaning that the third NUMA cluster 603 is designated as subordinate 664 to the first NUMA cluster 601 and that the third NUMA cluster 603 is designated as not-the-owner 666 of the requested data. The controller may further determine that the second NUMA cluster 602 is designated as the owner 646. In response to these determinations, a communication 668 may be sent over the shared interconnect from the third NUMA cluster 603 to the second NUMA cluster 602 to ensure serialization of the sixth data request 660 and coherency of the corresponding data contained in the sixth data request 660. The data may further be copied to a memory cache line 662 of the LLC of the third NUMA cluster 603. Because the data now exists in two NUMA clusters, particularly the second and third NUMA clusters 602, 603, another communication 669 may also instruct ownership of the corresponding data to be returned from the second NUMA cluster 602 to the first NUMA cluster 601. As such, the controller memories of the first, second and third NUMA clusters 601, 602, 603 may further be updated to indicate that the second NUMA cluster 602 is designated as not-the-owner 636 and that the first NUMA cluster 601 is designated as the owner 616.

The example systems and methods of the present disclosure achieve reduced latency for scenarios in which the NUMA system assigns PoC and PoS status to one NUMA cluster but the corresponding data is being handled by a different cluster. By reducing the latency of operations on the corresponding data, overall performance of the PEs in the NUMA cluster at which the corresponding data is stored can be increased. The proposed solution can be implemented with known NUMA architecture by assigning a static manager for the corresponding data to maintain a single point of responsibility for delegating the PoC and POS responsibilities, thereby avoiding the confusion and incoherency that would normally arise from changing the PoC or PoS.

While the above examples generally describe systems and methods in which both PoC and PoS of respective data is controlled, it should be understood that the underlying principles of the present application are also applicable to systems in which only one of PoC or PoS is controlled. For instance, a system may implement a different hierarchy or logic structure for dictating coherency or serialization, such as funneling all communications through one PoS node to a separate PoC node.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A multi-processing system comprising:
a plurality of separate clusters, each respective cluster including a respective plurality of processing engines and a respective memory shared by the processing engines of the respective cluster; and
a shared communications path communicatively connecting each of the plurality of clusters to one another, wherein for each unit of data stored in the memory of the plurality of clusters, a single manager cluster is permanently assigned as a manager responsible for assigning responsibility for maintaining an authoritative copy of the unit of data, and at any given time a single owner cluster is dynamically assigned the responsibility for maintaining the authoritative copy of the unit of data by the manager cluster.

2. The multi-processing system of claim 1, wherein the plurality of separate clusters are non-overlapping.

3. The multi-processing system of claim 2, wherein the respective memory shared by the processing engines of the respective cluster comprises cache lines, and wherein each respective cluster is configured to store data within the cache lines of the respective cluster.

4. The multi-processing system of claim 3, wherein the cache lines of the respective cluster are configured to communicate with cache lines of other clusters over the shared communications path.

5. The multi-processing system of claim 1, wherein each respective cluster further is programmed according to control logic to determine owner clusters, and is configured to determine the owner clusters for each unit of data originating at the respective cluster.

6. The multi-processing system of claim 5, wherein the control logic defines state information of the clusters, wherein the state information includes:
a first state indicating that a designated cluster is the manager and the owner cluster;
a second state indicating that the designated cluster is the manager and not the owner cluster;
a third state indicating that the designated cluster is not the manager and is the owner cluster; and
a fourth state indicating that the designated cluster is not the manager and is not the owner cluster.

7. The multi-processing system of claim 6, wherein the respective cluster is configured to communicate over the shared communications path only when the state information of the unit of data at the respective cluster is one of the second state or the fourth state.

8. The multi-processing system of claim 6, wherein the control logic includes a default setting for each unit of data originating at the respective cluster, wherein the default setting is the first state.

9. The multi-processing system of claim 8, wherein the control logic includes a rule for resetting the state of the unit of data to the first state in response to the unit of data being stored at two or more separate clusters.

10. The multi-processing system of claim 8, wherein the control logic includes a rule for determining the state of the unit of data to be the fourth state in response to the respective memory of the respective cluster lacking an indication of the state of the unit of data.

11. The multi-processing system of claim 1, wherein the plurality of clusters are configured to communicate at least one of a coherency check or a serialization operation over the shared communications path.

12. The multi-processing system of claim 1, wherein the respective memory includes one or more dynamic random access memory (DRAM) chips.

13. The multi-processing system of claim 1, wherein the respective memory further includes a second respective memory assigned to specific processing engines of the respective cluster, wherein the second respective memory is separate from the respective memory shared by the processing engines of the respective cluster.

14. A method comprising:

receiving, at a respective cluster of a multi-processing system including a plurality of separate clusters communicatively connected over a shared communications path, a unit of data for storage at the respective cluster;

assigning, by the respective cluster, the unit of data to a cache line of a respective memory shared by a plurality of processing engines of the respective cluster; and setting, by the respective cluster, each of a manager status and an ownership status of the cluster with respect to the unit of data assigned to the cache line, wherein setting the manager status and the ownership status is performed according to control logic, and wherein the control logic is configured to permanently assign one cluster of the multi-processing system as a manager cluster responsible for assigning responsibility to an owner cluster for maintaining an authoritative copy of the unit of data, and dynamically assign only one cluster of the multi-processing system as the owner cluster with the responsibility for maintaining the authoritative copy of the unit of data.

15. The method of claim 14, wherein the control logic defines state information of the clusters, wherein the state information includes:

a first state indicating that a designated cluster is the manager cluster and the owner cluster;

a second state indicating that the designated cluster is the manager cluster and not the owner cluster;

a third state indicating that the designated cluster is not the manager cluster and is the owner cluster; and a fourth state indicating that the designated cluster is not the manager cluster and is not the owner cluster.

16. The method of claim 15, further comprising sending, by the respective cluster, a communication to ensure serialization of a data request with respect to the unit of data only when the state information of the unit of data at the respective cluster is one of the second state or the fourth state.

17. The method of claim 16, wherein the communication is sent to the manager cluster.

18. The method of claim 15, further comprising applying a default setting for each unit of data originating at the respective cluster, wherein the default setting is the first state.

19. The method of claim 18, further comprising resetting the state of the unit of data to the first state in response to the unit of data being stored at two or more separate clusters.

20. The method of claim 15, further comprising determining the state of the unit of data to be the fourth state in response to the respective memory of the respective cluster lacking an indication of the state of the unit of data.

\* \* \* \* \*